United States Patent
Wu et al.

(10) Patent No.: US 11,432,475 B2
(45) Date of Patent: Sep. 6, 2022

(54) SOFT PLANT FOOD AND METHOD OF PRODUCING THE SAME

(71) Applicant: NATIONAL TAIWAN UNIVERSITY, Taipei (TW)

(72) Inventors: Sz-Jie Wu, Taipei (TW); Yuan-Tay Shyu, Taipei (TW); Liang-Chieh Lee, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 297 days.

(21) Appl. No.: 16/799,853

(22) Filed: Feb. 25, 2020

(65) Prior Publication Data
US 2021/0059124 A1 Mar. 4, 2021

(30) Foreign Application Priority Data
Sep. 4, 2019 (TW) ................. 108131792

(51) Int. Cl.
*A01G 7/06* (2006.01)
*A23L 3/015* (2006.01)
*A23L 19/00* (2016.01)
*A23B 9/00* (2006.01)
*A23L 5/30* (2016.01)

(52) U.S. Cl.
CPC ............... *A01G 7/06* (2013.01); *A23B 9/005* (2013.01); *A23L 3/0155* (2013.01); *A23L 5/30* (2016.08); *A23L 19/00* (2016.08)

(58) Field of Classification Search
CPC ............ A01G 7/06; A23L 5/30; A23L 3/0155; A23B 9/005
USPC .............................. 426/52, 615, 518, 519, 49
See application file for complete search history.

(56) References Cited

FOREIGN PATENT DOCUMENTS

JP 2004089181 A * 2/2004

OTHER PUBLICATIONS

Gabriella et al. "Effect of high pressure processing and vacuum packaging on the preservation of fresh-cut peaches", pp. 801-806, Science Direct, www.sciencedirect.com/science/article/pii/S0023643814005921 (Year: 2015).*

* cited by examiner

*Primary Examiner* — Helen F Heggestad

(57) ABSTRACT

Soft plant foods and a method of producing the same are revealed. The method includes steps of (a) providing a plant food; (b) immersing the plant food in a decomposition-enhancing enzyme solution; (c) performing a plurality of instances of high-pressure treatment on the plant food immersed in the decomposition-enhancing enzyme solution; (d) allowing the plant food having finished step (c) to react at 40 to 65° C. for 20 to 60 minutes; and (e) applying a pressure of at least 400 MPa on the plant food having finished step (d) for 3 to 10 minutes. The method is effective in speeding up the production process and preventing loss of nutrients of the plant foods.

8 Claims, 1 Drawing Sheet

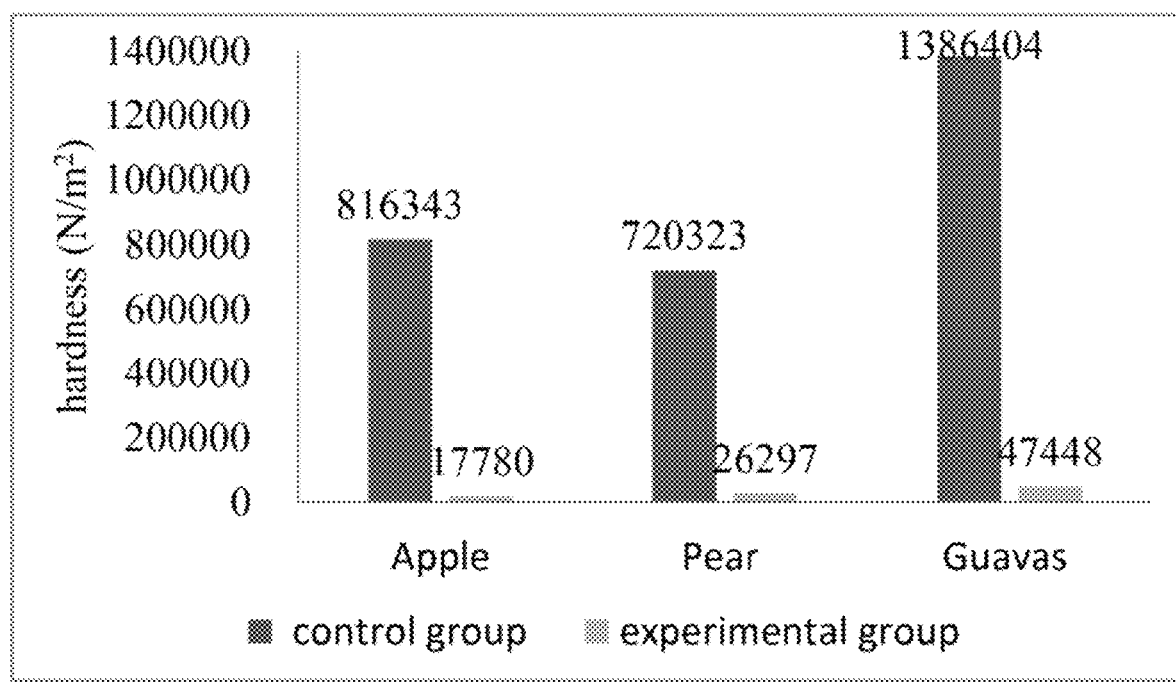

SOFT PLANT FOOD AND METHOD OF PRODUCING THE SAME

CROSS-REFERENCE TO RELATED APPLICATION

This non-provisional application claims priority under 35 U.S.C. § 119(a) on Patent Application No(s). 108131792 filed in Taiwan, R.O.C. on Sep. 4, 2019, the entire contents of which are hereby incorporated by reference.

BACKGROUND OF THE INVENTION

1. Field of the Invention

The present disclosure relates to soft plant foods and a method of producing the same, and in particular to a soft plant food softened by high-pressure treatment.

2. Description of the Related Art

The elderly are predisposed to loose teeth and poor mastication and thus unable to eat hard plant foods. Similarly, the inability to eat hard plant foods is not uncommon among patients with oral cavity diseases or diseases confined to the head and neck region, as these patients have difficulties in chewing and swallowing hard plant foods even after surgery. In an attempt to solve the problem with the inability to eat hard plant foods, commercial food providers and care providers serve puréed plant foods to the aforesaid elderly and patients. Although the puréed plant foods are easy to prepare and eat, the aforesaid elderly and patients cannot distinguish the puréed plant foods from each other, because the puréed plant foods look similar. Furthermore, the puréed plant foods are too unattractive in color and shape to arouse the appetite of the aforesaid elderly and patients. As a result, the aforesaid elderly and patients are reluctant to eat the puréed plant foods and thus susceptible to malnutrition.

In view of this, Taiwan patents 1469740, 1480001 disclose a method of producing a soft plant food. The production method involves freezing a plant food and then unfreezing the frozen plant food to allow cellular structure of the plant food to have ice crystals grown therein and then melted with a view to destructing the cellular structure of the plant food. After that, the production method involves immersing the plant food in a decomposition-enhancing enzyme solution under a depressurized condition to allow the decomposition-enhancing enzyme to enter the cellular structure of the plant food with a view to decomposing pectin-based and fibrous intercellular tissue of the plant food. The plant food thus produced by the production method keeps its shape and remains soft.

However, the conventional method of producing a soft plant food still poses unsolved issues. First, the conventional production method entails freezing, unfreezing and a lengthy enzymatic reaction. Second, before receiving softening treatment, the plant food undergoes blanching and heat treatment conducive to enzyme deactivation, and in consequence the production process takes much time. Third, after being frozen and then unfrozen, the plant food ends up with destroyed cellular tissue, and in consequence nutrients of the plant food immersed in a decomposition-enhancing enzyme solution under a depressurized condition go to the decomposition-enhancing enzyme solution, rendering the plant food less nourishing.

BRIEF SUMMARY OF THE INVENTION

To overcome the aforesaid drawbacks of the prior art, an objective of the present disclosure is to provide a method of producing a soft plant food, comprising the steps as follows: (a) providing a plant food; (b) immersing the plant food in a decomposition-enhancing enzyme solution; (c) performing a plurality of instances of high-pressure treatment on the plant food immersed in the decomposition-enhancing enzyme solution, each at 200 to 300 MPa for 5 to 15 seconds; (d) allowing the plant food having finished step (c) to react at 40 to 65° C. for 20 to 60 minutes; and (e) applying a pressure of at least 400 MPa on the plant food having finished step (d) for 3 to 10 minutes.

Regarding the method, in step (b), the plant food immersed in the decomposition-enhancing enzyme solution is kept in a vacuum sealed state.

Regarding the method, in step (b), the decomposition-enhancing enzyme is pectin hydrolytic enzyme, cellulose hydrolytic enzyme, or a combination thereof.

Regarding the method, in step (b), the decomposition-enhancing enzyme solution contains 0.05 to 0.5 wt % citric acid.

Regarding the method, in step (c), the high-pressure treatment is performed two to six times.

Regarding the method, in step (c), the high-pressure treatment is performed five times.

Regarding the method, in step (d), the plant food having finished step (c) is kept in 45° C. environment.

Regarding the method, in step (d), the plant food having finished step (c) reacts for 30 to 40 minutes.

To achieve at least the above objective, the present disclosure provides a soft plant food produced by the aforesaid production method.

Regarding the soft plant food, the soft plant food has a hardness of $1.0 \times 10^4$ N/m$^2$~$5.0 \times 10^4$ N/m$^2$.

The method is effective in speeding up the production process and preventing loss of nutrients of the plant foods.

BRIEF DESCRIPTION OF THE DRAWINGS

FIG. 1 is a bar chart illustrative of the hardness of different plant foods in control groups which do not undergo softening treatment and in experimental groups which undergo softening treatment according to embodiments of the present disclosure.

DETAILED DESCRIPTION OF THE INVENTION

To facilitate understanding of the object, characteristics and effects of this present disclosure, embodiments together with the attached drawings for the detailed description of the present disclosure are provided.

Soft Plant Food Production Method:

First, a plant food is provided. Then, the plant food is immersed in a decomposition-enhancing enzyme solution contained in a container. After that, a plurality of instances of first high-pressure treatment is performed on the plant food immersed in the decomposition-enhancing enzyme solution, each at 200~300 MPa for 5~15 seconds. Next, the plant food which has undergone the plurality of instances of first high-pressure treatment is kept in 40~65° C. environment, allowing its enzymes to react for 20~60 minutes. Finally, a second high-pressure treatment is performed on the plant food which has undergone the enzymatic reaction in the 40~65° C. environment for 20~60 minutes, with the second high-pressure treatment being performed at around 400 MPa or above for 3~10 minutes, so as to produce soft plant food.

In this embodiment, the soft plant food production method dispenses with complicated steps, such as freezing, unfreezing, and heating. Hence, the soft plant food production method in this embodiment takes less time than conventional soft plant food production methods. In this embodiment, the soft plant food production method dispenses with freezing and unfreezing and thus diminishes cellular destruction otherwise caused to the plant food before its immersion in the decomposition-enhancing enzyme solution. Therefore, in this embodiment, nutrients of the plant food immersed in the decomposition-enhancing enzyme solution do not end up in the decomposition-enhancing enzyme solution.

Heat-sensitive ingredients of plant foods, such as ascorbic acid and anthocyanidin, are likely to be thermally oxidized or degraded. As a result, conventional soft plant food production methods disadvantageously reduce the nutrients of plant foods which contain heat-sensitive ingredients and render the plant foods less visually attractive. In this embodiment, the soft plant food production method does not resort to heating and thus not only keeps the nutrients of plant foods which contain heat-sensitive ingredients but also maintains the appearance and color of the plant foods.

In this embodiment, the plant foods are exemplified by apples, guavas and pears. To enable the decomposition-enhancing enzyme to be absorbed into the plant foods, the plant foods are cut into cubes of desirable dimensions as needed, for example, each less than 100 mm in height and less than 40 mm in width.

In this embodiment, the container is a soft container (for example, a soft bag) or a rigid container (for example, a PET bottle). The purpose of the container is to not only provide the space in which the plant food and the decomposition-enhancing enzyme solution mix and react but also lower the likelihood that the plant food will undergo appearance changes or will crack because of collisions and compression during the production process.

In this embodiment, the decomposition-enhancing enzyme is pectin hydrolytic enzyme (pectinase), cellulose hydrolytic enzyme (cellulase), or a combination thereof. The pectin hydrolytic enzyme will work, provided that the enzyme enables pectin to undergo hydrolysis. Alternatively, the pectin hydrolytic enzyme is commercially-available merchandise, for example, Macerozyme 2A (produced by Yakult Pharmaceutical, wherein Macerozyme 2A contains 39% pectinase), Sumizyme SPG (produced by Shinnihon Chemicals), and Pectolyase (which contains 10% pectinase). The cellulose hydrolytic enzyme will work, provided that the enzyme enables cellulose to undergo hydrolysis. Alternatively, the cellulose hydrolytic enzyme is commercially-available merchandise, for example, Cellulase Y-NC. In a variant embodiment, it is feasible to use any other enzyme that decomposes the tissue of the plant food.

This embodiment is not restrictive of concentration of the decomposition-enhancing enzyme; the concentration will work, provided that it allows the plant food to be softened. The solvent for the decomposition-enhancing enzyme is water. The decomposition-enhancing enzyme is of a weight percent of 0.1~4.0%, preferably 0.2~2.0%. The decomposition-enhancing enzyme solution further contains an appropriate buffering agent, such as phosphate, to maintain stability and the pH conducive to reaction.

In this embodiment, the plant food immersed in the decomposition-enhancing enzyme solution is preferably kept in a vacuum sealed state to minimize bubbles in the container and ensure that the decomposition-enhancing enzyme solution immerses the plant food, thereby facilitating the subsequent high-pressure treatment and enzyme absorption. The vacuum sealed state is also useful to prevent intrusion of air into the plant food in high-pressure environment and resultant oxidation-induced decolorization of the plant food. In a variant embodiment, it is feasible that the plant food is not kept in a vacuum sealed state.

In this embodiment, the decomposition-enhancing enzyme solution preferably contains 0.05~0.5% citric acid, as citric acid is conducive to the softening of the plant food.

In this embodiment, the first high-pressure treatment enhances the absorption of enzymes into the plant food. However, the plant food is likely to be compressed at a high pressure, for example, one above 300 Mpa, and thus made compact, preventing full and complete absorption of the decomposition-enhancing enzyme into the plant food. When performed at 200~300 MPa, the high-pressure treatment is conducive to destruction of tissue of the plant food and thus the softening thereof. The softening of the plant food becomes more efficient when the high-pressure treatment is performed at 200~300 MPa repeatedly, preferably two times, three times, four times, five times or six times.

In this embodiment, the first high-pressure treatment is preferably still-water high-pressure treatment, using water as a medium whereby not only is pressure uniformly applied to the container that contains the plant food, but the decomposition-enhancing enzyme can also be uniformly absorbed into the plant food to ensure full, complete reaction between the decomposition-enhancing enzyme and the plant food.

In this embodiment, the conditions under which the first high-pressure treatment is performed are subject to changes as needed. For example, pressure of 200 MPa, 210 MPa, 220 MPa, 230 MPa, 240 MPa, 250 MPa, 260 MPa, 270 MPa, 280 MPa, 290 MPa or 300 MPa is applied to the plant food for 5, 6, 7, 8, 9, 10, 11, 12, 13, 14 or 15 seconds. The aforesaid conditions are appropriate but not restrictive of this embodiment.

In this embodiment, the first high-pressure treatment is performed on the plant food at a temperature and for a time period which are subject to changes as needed. For example, the temperature is preferably 45~60° C. or 45~50° C., most preferably 45° C., whereas the time period is preferably 30~50 minutes, most preferably 30~40 minutes. In a variant embodiment, the temperature is 40, 41, 42, 43, 44, 45, 46, 47, 48, 49, 50, 51, 52, 53, 54, 55, 56, 57, 58, 59, 60, 61, 62, 63, 64 or 65° C., and the time period is 20, 30, 35, 40, 45, 50, 55 or 60 minutes.

In this embodiment, the purpose of the second high-pressure treatment is to prevent enzymes in the plant food from continuing with reactions and minimize microorganisms present in the plant food (by destroying the enzymes existing in the microorganisms), as proteins can be destroyed under super high pressure. The duration of the second high-pressure treatment is subject to changes as needed, for example, 3, 4, 5, 6, 7, 8, 9 or 10 minutes.

Soft Plant Food Hardness Evaluation Method:

The evaluation method recommended by the Japan Care Food Conference is useful in evaluating the hardness of soft plant foods. This evaluation method is carried out with TA.XT plus Texture Analyzer. A hardness of less than 500,000 N/m$^2$ meets the specification standard of universal design food (UDF). The ultimate hardness of the soft plant food produced by the soft plant food production method in this embodiment falls within the range of 10,000~500,000 N/m$^2$, and thus patients with oral cavity diseases or diseases confined to the head and neck region and the elderly can chew the soft plant food easily.

Soft Apple Hardness Testing Method:

In this test, apples are made soft by the soft plant food production method under different conditions, and then the hardness of the soft apples is evaluated by the hardness evaluation method, as described below.

experimental groups 1~8 and immersed in the decomposition-enhancing enzyme solution are kept in a vacuum, sealed state.

After that, the apple cubes in experimental groups 1~8 undergo subsequent softening treatment by the soft plant food production method under different processing conditions stated in Table 1 below.

TABLE 1

The processing conditions for apple softening treatment

|  | Number of instances of 1st high-pressure treatment | Duration and pressure for 1st high-pressure treatment | Enzymatic reaction temperature and duration after 1st high-pressure treatment | Is 0.5 wt % citric acid added to decomposition-enhancing enzyme solution? |
|---|---|---|---|---|
| experimental group 1 | 5 | 300 MPa, 10 seconds | 45° C., 30 minutes | yes |
| experimental group 2 | 2 | 300 MPa, 10 seconds | 45° C., 30 minutes | yes |
| experimental group 3 | 5 | 200 MPa, 10 seconds | 45° C., 30 minutes | yes |
| experimental group 4 | 5 | 300 MPa, 10 seconds | 65° C., 30 minutes | yes |
| experimental group 5 | 5 | 300 MPa, 10 seconds | 45° C., 60 minutes | yes |
| experimental group 6 | 5 | 300 MPa, 10 seconds | 45° C., 30 minutes | no |
| experimental group 7 | 5 | 300 MPa, 10 seconds | 45° C., 30 minutes | yes |
| experimental group 8 | 5 | 300 MPa, 10 seconds | 45° C., 30 minutes | yes |

|  | Types of decomposition-enhancing enzyme | 2nd high-pressure treatment duration and pressure |
|---|---|---|
| experimental group 1 | pectin hydrolytic enzyme | 400 MPa, 10 minutes |
| experimental group 2 | pectin hydrolytic enzyme | 400 MPa, 10 minutes |
| experimental group 3 | pectin hydrolytic enzyme | 400 MPa, 10 minutes |
| experimental group 4 | pectin hydrolytic enzyme | 400 MPa, 10 minutes |
| experimental group 5 | pectin hydrolytic enzyme | 400 MPa, 10 minutes |
| experimental group 6 | pectin hydrolytic enzyme | 400 MPa, 10 minutes |
| experimental group 7 | cellulose hydrolytic enzyme | 400 MPa, 10 minutes |
| experimental group 8 | pectin hydrolytic enzyme | 400 MPa, 3 minutes |

First, nine apples of substantially equal weight are provided and assigned to a control group and experimental groups 1~8, respectively. Then, the apples in the control group and experimental groups 1~8 are diced into apple cubes 35~40 g in weight each. The apple cubes in the control group do not undergo the subsequent softening treatment. The apple cubes in experimental groups 1~8 undergo subsequent softening treatment by the soft plant food production method.

The apple cubes in experimental groups 1~8 are placed in eight soft packs, respectively, and then around 300 ml of 1% decomposition-enhancing enzyme solution (which contains 10% sucrose and 0.5% citric acid, except that the decomposition-enhancing enzyme solution to be added to the pack in experimental group 6 does not contain citric acid) is added to each of the packs in experimental groups 1~8. The volume, i.e., around 300 ml, of the decomposition-enhancing enzyme solution is sufficient for the apple cubes in experimental groups 1~8 to be immersed in the decomposition-enhancing enzyme solution.

Next, the packs in experimental groups 1~8 are put in a vacuum packaging machine to move gas from the packs, and the gas removal process takes 10~15 seconds. The packs in experimental groups 1~8 are sealed as soon as the gas removal process ends; hence, the apple cubes assigned to Finally, the hardness of the apple cubes assigned to the control group and experimental groups 1~8 and having undergone the softening treatment is evaluated by the hardness evaluation method.

TABLE 2

Hardness of apple cubes in the control group and experimental groups 1~8

|  | hardness (N/m$^2$) |
|---|---|
| control group | 816343 |
| experimental group 1 | 17780 |
| experimental group 2 | 50753 |
| experimental group 3 | 39253 |
| experimental group 4 | 38013 |
| experimental group 5 | 22158 |
| experimental group 6 | 26124 |
| experimental group 7 | 7996 |
| experimental group 8 | 38532 |

Some of the apple cubes assigned to the experimental groups 1~8 and having undergone the softening treatment are placed in 4° C. environment for seven days before being taken out for observation of their appearance. The observation result shows that the original appearance of these apple cubes in experimental groups 1~8 remains unchanged substantially. This indicates that the apple cubes in experimental groups 1~8 can be stored at 4° C. for at least one to two weeks without softening excessively (i.e., disfigurement). The other apple cubes assigned to the experimental groups 1~8 and having undergone the softening treatment are placed in −20° C. environment for 24 hours before being taken out to be unfrozen and then their appearance be observed. The observation result shows that these apple cubes in experimental groups 1~8 keep their appearance and stay soft. This indicates that the apple cubes in experimental groups 1~8 can be instant food preserved by refrigeration or freezing.

Soft Pear Hardness Testing Method:

In this test, the soft pear hardness test is carried out by the soft apple hardness testing method. The experimental process flow of this test is substantially identical to the soft apple hardness testing method except for the experimental conditions described below.

1. In this test, two pears of substantially equal weight are provided and assigned to a control group and an experimental group, respectively.

2. In this test, the decomposition-enhancing enzyme is 1% pectin lyase solution which contains 10% sucrose, 0.4% citric acid and 0.2% vitamin C, and the volume of the pectin lyase solution is sufficient to allow the pears in experimental group to be immersed in the pectin lyase solution.

3. The first high-pressure treatment is performed under the conditions, i.e., five times at 200 MPa for 10 seconds.

4. After the first high-pressure treatment, the enzymatic reaction temperature and duration are 50° C. and 5~15 minutes, respectively.

5. The second high-pressure treatment is performed at 400 MPa for 10 minutes.

Although the experimental conditions of this test are different from the experimental conditions of the soft apple hardness testing method, this test is identical to the soft apple hardness testing method in terms of process flow.

Finally, after undergoing softening treatment, the pear in the control group and the pear in the experimental group are evaluated for their hardness by the hardness evaluation method.

TABLE 3

Hardness of the pear in the control group
and the pear in the experimental group

| | hardness (N/m$^2$) |
|---|---|
| control group | 720323 |
| experimental group | 26297 |

After undergoing the softening treatment, some of the pear cubes in the experimental group are placed in 4° C. environment for seven days before being taken out to observe their appearance. The observation result shows that the original appearance of these pear cubes in the experimental group remains unchanged substantially. This indicates that the pear in the experimental group can be stored at 4° C. for at least one to two weeks without softening excessively (i.e., disfigurement). The other pear cubes assigned to the experimental group and having undergone the softening treatment are placed in −20° C. environment for 24 hours before being taken out to be unfrozen and then their appearance be observed. The observation result shows that these pear cubes in the experimental group keep their appearance and stay soft. This indicates that the pear cubes in the experimental group can be instant food preserved by refrigeration or freezing.

Soft Guavas Hardness Testing Method:

In this test, the soft guavas hardness test is carried out by the soft apple hardness testing method. The experimental process flow of this test is substantially identical to the soft apple hardness testing method except for the experimental conditions described below.

1. In this test, two guavas of substantially equal weight are provided and assigned to a control group and an experimental group.

2. In this test, the decomposition-enhancing enzyme is 0.1% pectin lyase solution, containing 10% sucrose and 0.1% citric acid and being plenty enough to immerse the guava of the experimental group.

3. The first high-pressure treatment is performed under the conditions as follows: at 200 MPa for 10 seconds and five times.

4. After the first high-pressure treatment, the enzymatic reaction temperature and duration are 50° C. and 5~10 minutes, respectively.

5. The second high-pressure treatment is performed at 400 MPa for 10 minutes.

The experimental process flow of this test is substantially identical to the soft apple hardness testing method except for the experimental conditions described above.

Finally, after undergoing the softening treatment, the guava in the control group and the guava in the experimental group are evaluated for their hardness by the hardness evaluation method.

TABLE 4

Hardness of the guava in the control group
and the guava in the experimental group

| | hardness (N/m$^2$) |
|---|---|
| control group | 1386404 |
| experimental group | 47448 |

After undergoing softening treatment, some of the guava cubes in the experimental group are placed in 4° C. environment for seven days before being taken out to observe their appearance. The observation result shows that the original appearance of these guava cubes in experimental group remains unchanged substantially. This indicates that The observation result shows that the guava cubes in the experimental group can be stored at 4° C. for at least one to two weeks without softening excessively (i.e., disfigurement). The other guava cubes assigned to the experimental group and having undergone the softening treatment are placed in −20° C. environment for 24 hours before being taken out to be unfrozen and then their appearance be observed. The observation result shows that these guava cubes in the experimental group keep their appearance and stay soft. This indicates that the guava cubes in the experimental group can be instant food preserved by refrigeration or freezing.

Plant Food Before and after Softening Treatment

FIG. 1 is a bar chart illustrative of the hardness value of the control group and experimental group 1 in the soft apple hardness test, the hardness value of the control group and experimental group in the soft pear hardness test, and the hardness value of the control group and experimental group in the soft guava hardness test. As shown in FIG. 1, hardness of the apples, pears and guavas which have undergone softening treatment is much lower than pre-treatment hardness, indicating that plant foods produced by the soft plant food production method attain satisfactory softness.

The soft plant food production method entails performing high-pressure, heat-free softening treatment and thus is effective in speeding up the production process and preventing loss of nutrients of plant foods. Furthermore, the heat-free softening treatment allows the soft plant food production method to reduce loss of nutrients of plant foods which contain heat-sensitive ingredients but retain the appearance and colors of the plant foods. Last but not least, the soft plant foods produced by the soft plant food production method can be stored by refrigeration or freezing without a diminution in appearance and taste. Therefore, the soft plant foods can be instant food preserved by refrigeration or freezing.

While the present disclosure has been described by means of specific embodiments, numerous modifications and variations could be made thereto by those skilled in the art without departing from the scope and spirit of the present disclosure set forth in the claims.

What is claimed is:

1. A method of producing a soft plant food, comprising steps of:
   (a) providing a plant;
   (b) immersing the plant in a decomposition-enhancing enzyme solution;
   (c) performing a plurality of instances of high-pressure treatment on the plant immersed in the decomposition-enhancing enzyme solution, each at 200 to 300 MPa for 5 to 15 seconds;
   (d) allowing the plant having finished step (c) to react with the decomposition-enhancing enzyme solution at 40 to 65° C. for 20 to 60 minutes; and
   (e) applying a pressure of at least 400 MPa on the plant having finished step (d) for 3 to 10 minutes.

2. The method of claim 1, wherein, in step (b), the plant immersed in the decomposition-enhancing enzyme solution is kept in a vacuum sealed state.

3. The method of claim 1, wherein, in step (b), the decomposition-enhancing enzyme is pectin hydrolytic enzyme, cellulose hydrolytic enzyme, or a combination thereof.

4. The method of claim 1, wherein, in step (b), the decomposition-enhancing enzyme solution contains 0.05 to 0.5 wt % citric acid.

5. The method of claim 1, wherein, in step (c), the high-pressure treatment is performed two to six times.

6. The method of claim 5, wherein, in step (c), the high-pressure treatment is performed five times.

7. The method of claim 1, wherein, in step (d), the plant having finished step (c) is kept in 45 environment.

8. The method of claim 1, wherein, in step (d), the plant having finished step (c) reacts for 30 to 40 minutes.

* * * * *